United States Patent [19]

Ris et al.

[11] Patent Number: 5,016,298
[45] Date of Patent: May 21, 1991

[54] ACCESSORY SET FOR KITCHEN SINKS

[75] Inventors: Max Ris, Wangen/bei Olten; André Monnard, Olten, both of Switzerland

[73] Assignee: Niro-Plan AG, Zug, Switzerland

[21] Appl. No.: 490,499

[22] Filed: Feb. 28, 1990

Related U.S. Application Data

[63] Continuation of Ser. No. 238,091, Aug. 29, 1988, abandoned.

[30] Foreign Application Priority Data

Sep. 8, 1987 [DE] Fed. Rep. of Germany ....... 3730072

[51] Int. Cl.⁵ .............................................. A47K 1/00
[52] U.S. Cl. ...................................................... 4/654
[58] Field of Search ................................. 4/629-631, 4/638, 641, 654; 108/25, 26, 26.2; 312/140.1, 140.4; 134/115 R

[56] References Cited

U.S. PATENT DOCUMENTS

| | | | |
|---|---|---|---|
| 1,972,202 | 9/1934 | Purves | 108/262 |
| 2,929,075 | 3/1960 | Hyde | 4/629 |
| 3,126,552 | 3/1964 | Scharmer | 4/633 |
| 4,041,964 | 8/1977 | Shamoon | 4/654 X |
| 4,456,021 | 6/1984 | Leavens | 4/630 X |
| 4,689,840 | 9/1987 | Muck et al. | 4/629 |

FOREIGN PATENT DOCUMENTS

| | | | |
|---|---|---|---|
| 147094 | 9/1931 | Switzerland | 4/638 |
| 1266295 | 3/1972 | United Kingdom | 4/641 |

OTHER PUBLICATIONS

Publ. Issue 3, 1978, Kuchentechnik; p. K 267; "Colander and Multiple Use Dishwashing Center".
Publ. issued Nov. 1976; p. 1489; Bianco—Dual Use Idea Suceeds; heating and cooling publication.
Blanco K-chenzentrum Duoform, May 1978, pp. 1-6, illustrations 1-10.

Primary Examiner—Charles E. Phillips
Attorney, Agent, or Firm—Frishauf, Holtz, Goodman & Woodward

[57] ABSTRACT

The invention relates to an accessory set consisting of a cutting board and a colander. The cutting board is provided with a cut-out, whose position and contour are calculated in such a way that the cutting board and the colander, together and complementarily, can be placed in the basin of a sink.

3 Claims, 2 Drawing Sheets

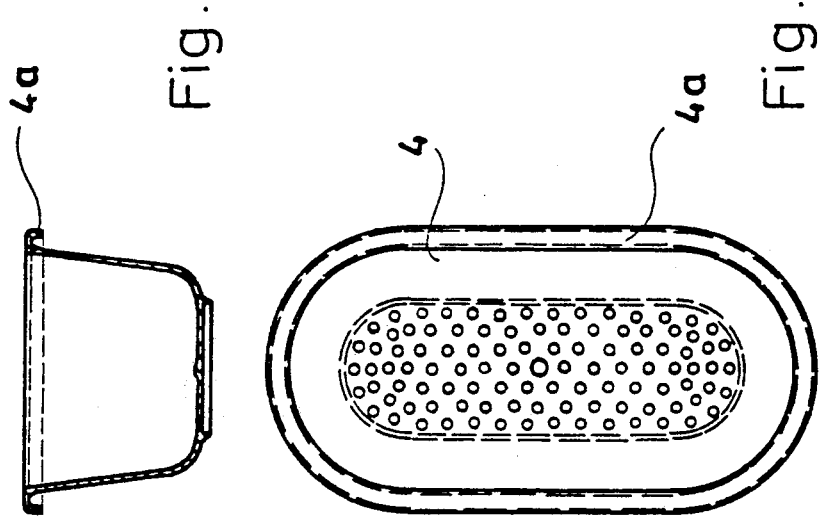
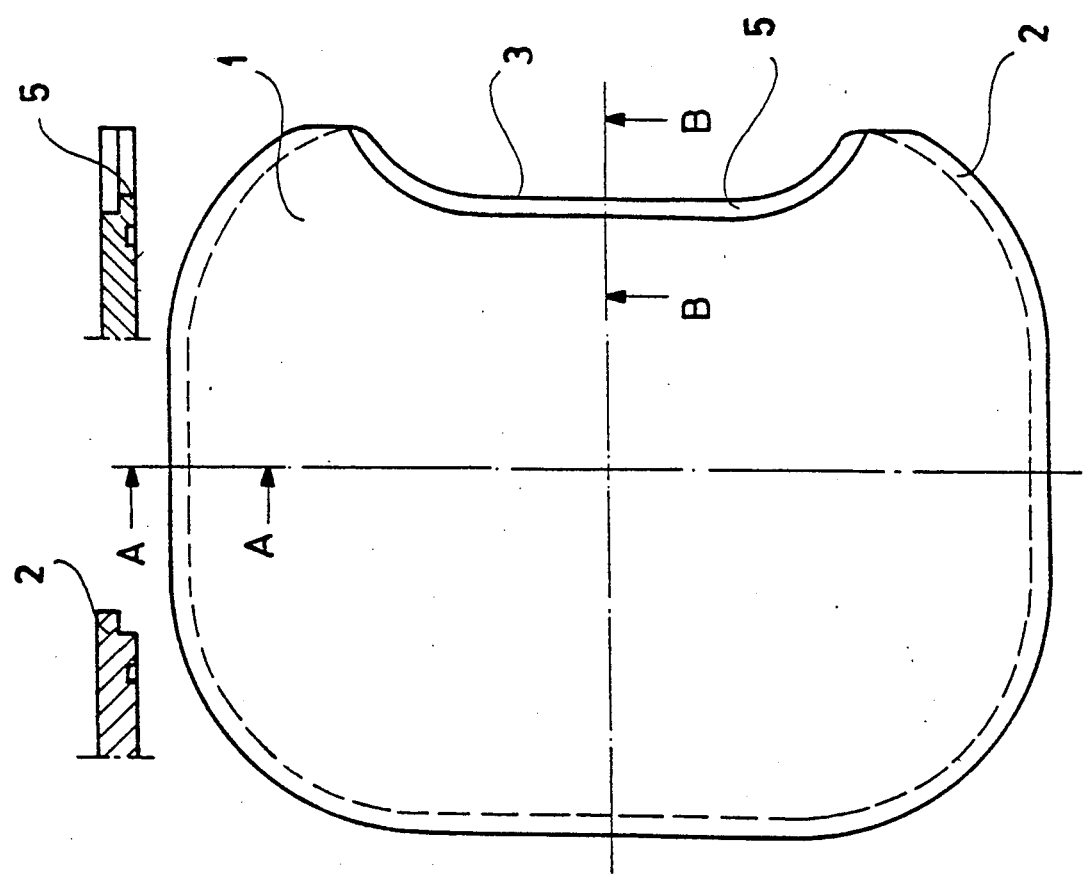

ACCESSORY SET FOR KITCHEN SINKS

This application is a continuation, of application Ser. No. 238,091, filed Aug. 29, 1988, now abandoned.

The invention relates to an accessory set for kitchen sinks, consisting of a cutting board which can be placed on the rim of the sink, and of a colander which can be placed particularly in a smaller side compartment, such as a compartment for scraps.

In order to expand the possibilities of utilization, cutting boards and colanders have been offered for quite some time in most varied forms of execution.

The cutting boards correspond in their contour approximately to that of the sink, and when concerned with symmetrical sinks also to that of the drain-off area thus can be placed on one of these two sink areas and then can be used as flat work surfaces, for example for cutting or cleaning of food.

The colanders in their measurements are adapted to the contour of a smaller, additional sink (compartment) so that they can be placed into this sink. They function mainly as draining sinks or for the collection of scraps when cleaning food.

THE INVENTION

Proceeding from this state of the art, it is the task of the present invention to find new possibilities of application for the cutting board and the colander and thus also improve the functional value of the sink in conjunction with which they are used.

Briefly, the present invention features a cutting board cut out at its rim portion according to the contour of the colander in such a manner that both parts can together, complementarily, be placed on the rim of the sink or in the sink.

The invention thus is based on adapting the cutting board and colander, which have thus far have always been used independently of each other, in such a way that they can be placed in the sink together. By doing that, the following advantages of utilization result: First, when cutting or cleaning on the cutting board, scraps can be pushed more easily and directly into the colander than with the heretofore practiced spatial separation between these two accessories. Secondly, the quality of simple one-compartments is additionally enhanced through the accessory in accordance with the invention by adding the function of a scrap collector or the like, and, thirdly, despite the sink being covered up by the cutting board, one still has at one's disposal the colander for washing purposes or the like. Furthermore, the two accessory parts retain their former advantageous characteristics since they can also be used separately and independently of each other.

When structurally designing the present invention, it is recommended to shape the cutting board and the colander with respect to their contours in such a way that they fit together without a gap. It is also recommended that both parts fit together flush at their top surface; if necessary, the cutting board can have a somewhat higher level than the upper rim of the colander, since the pushing off of scraps and the like into the colander is not impeded thereby.

In order for the cutting board and colander to be held firmly in the basin of the sink, the colander suitably at its upper rim is in detachably locked engagement with the cut-out of the cutting board which faces it. For this purpose the colander can be jammed between cut-out and the rim of the sink. There is also the possibility of an interlocking connection between colander and cutting board.

In general, the colanders have on their top portion an outwardly extending rim, with which they rest on the rim of the scrap basin or the like. In this case, it is recommended to provide the cut-out of the cutting board with a step or depression, so that the rim of the colander can be used in the same manner for fixedly holding same.

This step, preferably, is at the same height as the rim of the sink. Thus, the colander, when inserted, will automatically be in upright position without having to provide the rim of the colander without having to apply special provisions.

The invention described can be applied with any sink construction, that is, practically square, round and elliptical sink shapes. If one choses a sink shape which, at its side wall, where the position of the colander is planned, has an asymmetrical expanded cross section, the sink will distinguish itself by particularly compact construction and pleasant appearance.

The cooperation according to the invention of cutting board and colander can of course also be realized when instead of the colander a closed container is used. The protection of the present invention therefore also is meant to cover this aspect.

DRAWINGS

Further characteristics and advantages of the invention result from the following description of an example in the light of the drawing, wherein:

FIG. 1 is a top view of a cutting board cut out corresponding to the contour of the colander;

FIG. 2 is a top view of the colander matching the same;

FIG. 3 is a cross-sectional view of the colander of FIG. 2;

DETAILED DESCRIPTION

Figure 4:
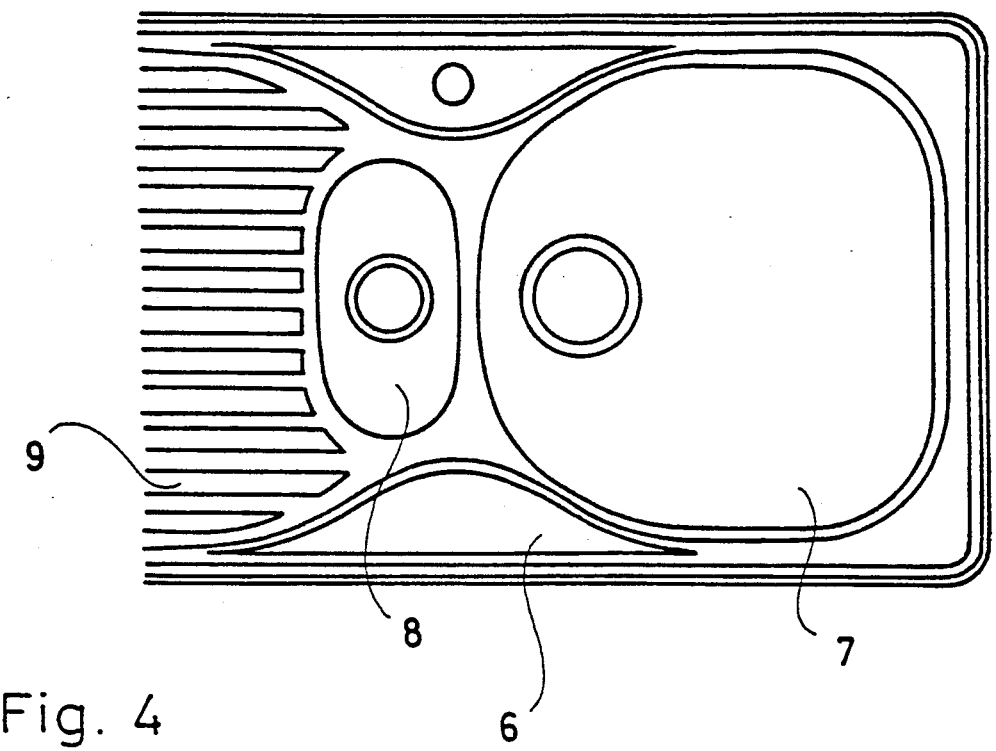
FIG. 4 is a top view of a sink.

The cutting board 1 shown in FIG. 1 has, for most of its circumference, customary shape, it is thus adapted, in this respect, to the contour of the sink (compare FIG. 4) and provided, along its circumference, with a shoulder 2 so that it can be placed on the upper rim of the sink in customary manner and supported by same.

It is now essential that the cutting board 1 on a portion of its circumference—preferably at one of its side edges—be provided with a cut-out 3. This cut-out is, on the one hand, adapted to the contour of the colander 4, compare FIGS. 2 and 3, and, on the other, in its position makes an incursion into the cutting board to such an extent that the cutting board can be placed in the sink together with the colander 4.

While the colander 4 may totally correspond to customary construction, that is, on the top provided with an outwardly protruding rim and optionally also with a rim 4a which is angled off downwardly, provisions must be made in the cutting board 1 in the region of the cut-out 3 so that the colander 4 can be secured in place. For this purpose, the cut-out 3 has a step 5 projecting at the bottom—compare section B—B in FIG. 1—on which the rim 4a of the colander can be placed. The top surface of the colander then merges flush with the top surface of the cutting board.

On the other side of the colander the projecting rim 4a is placed on the rim of the basin. The colander is thereby securely anchored in the sink together with the cutting board.

Figure 5:
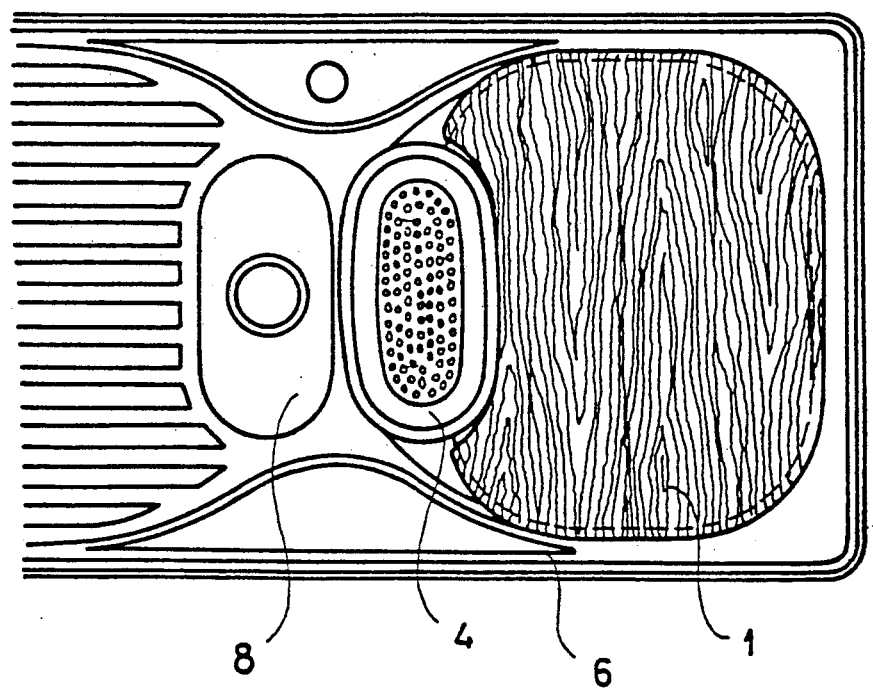
FIG. 5 is a top view of the sink of FIG. 4 with cutting board and colander shown in place.

FIGS. 4 and 5 show the application of the cutting board and the colander in a kitchen sink 6. It has a main sink compartment 7, a smaller side compartment 8 and a drain-off area 9 which is shown only partially. For the side compartment 8, the colander 4 is usually shipped as an accessory. In accordance with the invention, this colander can now be placed not only in the side compartment 8 but in combination with the cutting board 1 also in the main sink compartment 7.

With sinks that do not have a side compartment, the combination according to the invention offers the advantage that the sink subsequently becomes adapted for the insertion of a colander.

We claim:

1. Accessory set for a kitchen sink having a first drainage basin (7) and a second, smaller, drainage basin (8), comprising
   a cutting board which can be placed on a rim of said first basin of said sink a colander (4), with at least two edges, which is adapted and dimensioned for mounting on a peripheral rim of said smaller drainage basin (8),
   wherein said cutting board (1) and said colander (4) each have a circumferential contour, a portion of which matches a portion of the contour of the other, so that a user can place said colander (4), selectively, either covering said smaller drainage basin (8) or alongside the cutting board on a portion of the rim of the first drainage basin of said sink (7), said portion of the rim and board supporting respective colander edges;
   an upper portion of said colander (4) has an outwardly extending rim (4a) and
   said cutting board (1) is formed with a profiled edge (3) having a step (5) which matches and supports said outwardly extending rim (4a) so that said cutting board (1) and said colander (4) fit together all along their adjacent peripheries without an intervening gap;
   and wherein said cutting board (1) and said colander (4) have respective top surfaces which are at the same elevation and fit flushly together.

2. Accessory set according to claim 1, wherein said step (5), when the cutting board rests on the sink, is at the same elevation or level as the rim of the sink.

3. The combination of claim 1, further comprising
   a drain-off area (9) extending from a side of said smaller drainage basin (8) remote from said first drainage basin (7).

* * * * *